(12) United States Patent
Zhang et al.

(10) Patent No.: US 11,576,022 B2
(45) Date of Patent: Feb. 7, 2023

(54) HANDLING COMMUNICATION OF DATA IN A BLUETOOTH LOW ENERGY (BLE), MESH NETWORK

(71) Applicant: Telefonaktiebolaget LM Ericsson (publ), Stockholm (SE)

(72) Inventors: Jingcheng Zhang, Svärtinge (SE); Piergiuseppe Di Marco, Teramo (IT); Per Elmdahl, Linköping (SE); Thomas Rimhagen, Linköping (SE); Wei Shen, Linköping (SE); Per Skillermark, Årsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 210 days.

(21) Appl. No.: 16/609,815

(22) PCT Filed: Jun. 7, 2018

(86) PCT No.: PCT/SE2018/050594
§ 371 (c)(1),
(2) Date: Oct. 31, 2019

(87) PCT Pub. No.: WO2018/236265
PCT Pub. Date: Dec. 27, 2018

(65) Prior Publication Data
US 2020/0059771 A1 Feb. 20, 2020

Related U.S. Application Data

(60) Provisional application No. 62/523,270, filed on Jun. 22, 2017.

(51) Int. Cl.
*H04W 4/80* (2018.01)
*H04L 67/1042* (2022.01)
(Continued)

(52) U.S. Cl.
CPC ........... *H04W 4/80* (2018.02); *H04L 67/1042* (2013.01); *H04W 8/005* (2013.01); *H04W 40/10* (2013.01); *H04W 40/12* (2013.01); *H04W 84/18* (2013.01)

(58) Field of Classification Search
CPC ....... H04W 4/80; H04W 8/005; H04W 40/10; H04W 40/12; H04W 84/18; H04L 67/1042
See application file for complete search history.

(56) References Cited

U.S. PATENT DOCUMENTS

2016/0380778 A1 12/2016 Shen et al.
2017/0135021 A1 5/2017 Ko et al.
(Continued)

FOREIGN PATENT DOCUMENTS

CN 101394357 A 3/2009
EP 3079387 A1 10/2016
(Continued)

OTHER PUBLICATIONS

European Office Action for European Patent Application No. 18819860.0 dated Feb. 1, 2021, 6 pages.
(Continued)

*Primary Examiner* — Nishant Divecha
(74) *Attorney, Agent, or Firm* — Sage Patent Group

(57) ABSTRACT

Embodiments herein relate to e.g. a method performed by a network node (10) for handling communication of data in a Bluetooth Low Energy (BLE) mesh network (1). The network node obtains a neighbor table, wherein the neighbor table is based on messages received from different network nodes; and selects an association between network nodes in the BLE mesh network (1) taking the neighbor table into account.

16 Claims, 14 Drawing Sheets

(51) Int. Cl.
    *H04W 8/00*     (2009.01)
    *H04W 40/10*     (2009.01)
    *H04W 40/12*     (2009.01)
    *H04W 84/18*     (2009.01)

(56) References Cited

U.S. PATENT DOCUMENTS

| | | |
|---|---|---|
| 2017/0156102 A1 | 6/2017 | Singh et al. |
| 2018/0035247 A1 | 2/2018 | Raghu et al. |
| 2018/0352493 A1* | 12/2018 | Strater .................. H04W 36/30 |

FOREIGN PATENT DOCUMENTS

| | | | | |
|---|---|---|---|---|
| WO | WO-2004034648 A2 * | 4/2004 | ............ | H04W 48/17 |
| WO | WO 2014/127104 A2 | 8/2014 | | |
| WO | WO-2016137375 A1 * | 9/2016 | ........... | H04L 47/781 |
| WO | WO 2016/191258 A1 | 12/2016 | | |

OTHER PUBLICATIONS

European Search Report for European Application No. EP 18819860 dated Mar. 30, 2020, 4 pages.
International Search Report and Written Opinion of the International Searching Authority, PCT/SE2018/050594, dated Oct. 30, 2018, 13 pages.

\* cited by examiner

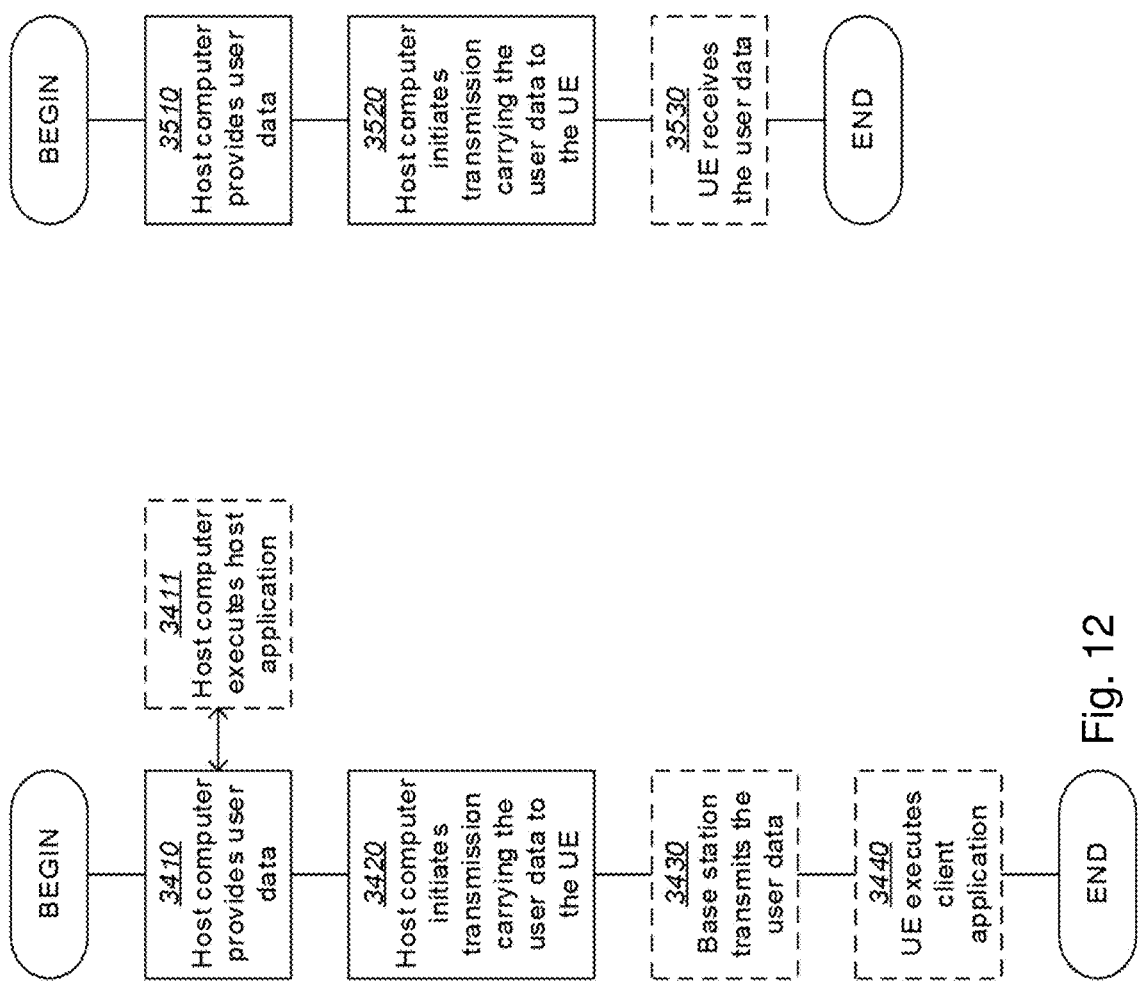

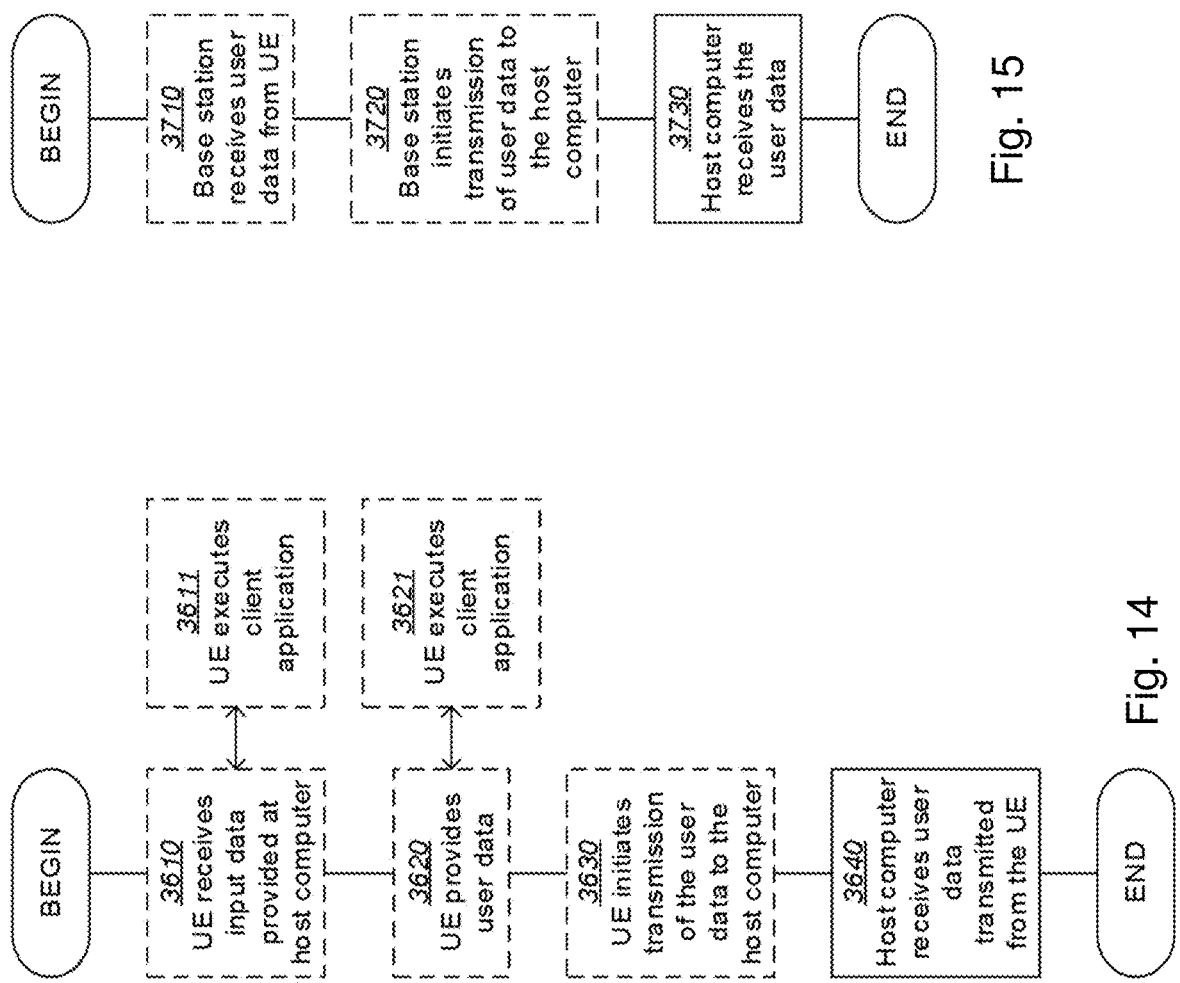

HANDLING COMMUNICATION OF DATA IN A BLUETOOTH LOW ENERGY (BLE), MESH NETWORK

This application is a 35 U.S.C. § 371 national stage application of PCT International Application No. PCT/SE2018/050594 filed on Jun. 7, 2018, which in turns claims domestic priority to U.S. Provisional Patent Application No. 62/523,270, filed on Jun. 22, 2017, the disclosures and content of which are incorporated by reference herein in their entirety.

TECHNICAL FIELD

Embodiments herein relate to a network node and a method performed therein for communication. Furthermore, a computer program product and a computer readable storage medium are also provided herein. In particular, embodiments herein relate to handling communication of data in a wireless communications network.

BACKGROUND

In a typical wireless communications network, wireless devices, also known as wireless communication devices, mobile stations, stations (STA) and/or user equipments (UE), communicate via a Radio Access Network (RAN) to one or more core networks (CN). The RAN covers a geographical area which is divided into service areas or cells, with each service area or cell being served by a radio network node such as a radio access node e.g., a Wi-Fi access point or a radio base station (RBS), which in some networks may also be denoted, for example, a "NodeB", a "gNodeB", or a "eNodeB". A service area or cell is a geographical area where radio coverage is provided by the radio network node. The radio network node communicates over an air interface operating on radio frequencies with the wireless device within range of the radio network node.

Bluetooth low energy (BLE) is a wireless personal area network technology designed by the Bluetooth Special Interest Group (SIG) aimed at novel applications in the healthcare, fitness, security, and home automation industries. Compared to classic Bluetooth, BLE is intended to provide considerably reduced power consumption and cost while maintaining a similar communication range. On the other hand, the amount of data being transmitted by the BLE devices is much less than the classic Bluetooth devices.

A BLE mesh network comprising BLE mesh nodes, also referred to as network nodes, is an on-going standardization work that aims at extending the coverage of the BLE network. The BLE mesh network uses BLE advertisement channels for data communication so that the BLE mesh nodes that are within a radio range can communicate directly without establishing the data channel communication.

There are two kinds of message forwarding methods considered in the BLE mesh networks, i.e., a flooding method and a routing method. When using the flooding method, all the BLE mesh nodes participate in the forwarding of the message. When using the routing method, a route is created between a route originator (RO) node and a route destination (RD) node. Only relay nodes, also known as routers, which belong to a created route, will forward the message.

As shown in FIG. 1, three advertisement channels are defined in the BLE technology, i.e., ch37, ch38 and ch39. A BLE mesh message is sent at all three advertisement channels within one advertisement event. There is no link layer acknowledgement mechanism defined in the mesh communication. Sometimes, the same message is retransmitted multiple times using multiple advertisement events. A relay node is a device whose radio receiver is always on and scans advertisement channels one at a time. The relay node may sequentially scan the three advertisement channels.

In the BLE mesh network, the routing enabled mesh relay nodes create routes between the RO node(s) and the RD node(s). Once a message is routed, it is only forwarded by the routers which are inside the route from the RO node to the RD node. Other nodes do not forward this message. An algorithm for creating route(s) is a distance vector based algorithm, FIG. 2A and FIG. 2B show a general description of this algorithm when a route originator node A wants to create a route to route destination node B.

As shown in FIG. 2A, a RO node A starts a route discovery procedure by sending a route request (RREQ) message through the whole BLE mesh network. The RREQ is a single-hop broadcast message, which means the RREQ is only transmitted one hop to a next router. Any intermediate router that receives this message will generate a new RREQ message, which router uses its own address as a new RREQ network source address. The RREQ message propagation continues until a route destination B receives a RREQ message, shown in FIG. 2B. When route destination node B receives the RREQ messages, the route destination node B selects the "best" router or network node by sending a unicast Route Response (RREP) message. Once the selected network node receives the RREP message, it repeats the same procedure and generates a new RREP message until the RREP message reaches the RO node A. FIG. 2B shows the route creation procedure between RO(A) and RD(B) using RREP. Before device B sends a RREP to network node Q, it has received RREQ messages from network nodes Q, N and X. Different algorithms can be used to choose the best network node. Two algorithms are defined for network node selection in the specification, the hop count based network node selection and receive signal strength indication (RSSI) based network node selection. As defined in the hop-count algorithm, the network node that sends the RREQ using the minimum hop count is selected as the best network node. In the RSSI based algorithm, the network node that sends the RREQ with the maximum accumulated RSSI value is selected as the best network node.

Friendship is used by network nodes such as low-power nodes (LPN) to limit an amount of time that network nodes need to be active and scan for incoming messages. If a network node cannot receive continuously, then it is possible that it will not receive mesh messages that it should process. Friendship is a special relationship between a LPN and one relay node called friend node. Friendship is first established and initiated by the LPN. Once the friendship relationship is established, the friend node maintains a message queue that stores all incoming messages addressed to the LPN. The friend node delivers those messages to the LPN when requested by the same LPN.

Hence, the friendship establishment procedure is initiated by the LPN. As shown in FIG. 3, the LPN firstly sends a friend request message. Each of the network nodes that support friendship features responds by sending back a friend offer message to the requesting LPN. The friend offer messages also include additional information, such as the received signal strength indicator (RSSI) measured on a reception of the friend request message and capabilities of each of the offering relay nodes. This allows the LPN to determine which of these friend offer messages the LPN will accept. The LPN will then send a Friend Poll message to its chosen Friend node, to which the Friend node will respond with a Friend Update message. At this point, the friendship is established.

FIG. 4 shows a summary of the RSSI measurement distribution of one BLE mesh relay with five surrounding stationary BLE mesh relay nodes in one hour. The surrounding devices send messages regularly and the measured RSSI values are shown in FIG. 4. The lowest recorded RSSI for the received messages is around −90 dBm. The measurement curve of channels SC2 and RL2 indicate that the RSSI value from the same device may vary around 15 dB. This may be due to that a radio environment is different on different advertising channels and channel varies over time, even on a same advertising channel, due to multi-path fading. The curves show that using one single transient RSSI measurement to assess the advertisement channel is not sufficient and not accurate.

The relay node uses a BLE scanning procedure to receive the RREQ messages. The BLE specification has defined two parameters to control a scanning duty cycle, a first parameter denoted SCAN_INTERVAL and a second parameter denoted SCAN_WINDOW. The relay node stays in one advertisement channel during a SCAN_INTERVAL. The SCAN_WINDOW defines a receiving period during the SCAN_INTERVAL. The relay node shall have a 100% scan duty cycle to receive most of the BLE mesh messages. Once a current scan interval expires, the relay node scans on the next advertisement channel. As defined by the Bluetooth specification, the BLE device shall scan all three advertisement channels one by one. It is not allowed to skip one of the advertisement channels during the scanning.

In this case, in a BLE mesh network, even if an advertisement channel is detected as a "bad channel", the relay node cannot black-list that channel due to this limitation.

A hop-count based routing method creates a route using a minimum number of hops between the RO node and RD node. FIG. 5 shows one simple example when the RO node A wants to create a route to the RD node B. RD node B receives two RREQ messages sent from relay nodes N and Q. The hop count contained in the RREQ from N is 2 (A->M, M->N) and the hop-count of the RREQ sent from Q is 3 (A->E, E->P, P->Q). In this case, the route with hop count 2 is selected since it uses less hop count from the RO node A to reach the RD node B. The communication between RO node A and RD node B via the route created with least hop count also uses shorter delay time and generates less message transactions.

This hop-count based routing method works fine if a radio link between each hop is reliable. However, in a wireless communications network, less hop count usually means longer distance between each hop. The longer the distance between two relay nodes, the lower the signal strength of the received message. Moreover, since the RSSI fluctuates as described above, the radio link created by the hop-count based routing method may easily break since the radio links are already in a relatively low RSSI level. Thus, the route created by only using hop-count may not be stable enough.

Another route selection method defined in the current specification is a signal strength based method. Instead of counting the hop count, the RSSI value of each hop along the route is accumulated and the path with highest RSSI is selected. However, problems could happen when the RSSI of one "poor" radio link is higher than the accumulated RSSI values of several good radio links. For example, in FIG. 5, if the RSSI value between A and M is −85 dBm, it is higher than the accumulated RSSI value of the radio link A->E (−50 dBm) and E->P (−50 dBm), in this case, the route with poor radio link is selected. The signal strength based method cannot guarantee the communication reliability of the created route since the accumulated RSSI does not indicate the RSSI values per hop.

The RSSI value communicated in the friend offer message is based on a single measurement on one advertising channel and does not account for the variability of the RSSI measurement in the other advertising channels. If the radio link with the friend node has bad quality in one of the other channels, successful communication is prevented when the LPN scans on that channel. Losses of data and retransmissions of unsuccessful transmitted data messages are expensive in terms of e.g. power consumption for the LPN and limits or reduces performance of the wireless communication network.

SUMMARY

An object of embodiments herein is to provide a mechanism for improving performance of a wireless communications network in an efficient manner.

According to an aspect the object is achieved by providing a method performed by a network node for handling communication of data in a Bluetooth Low Energy (BLE) mesh network. The network node obtains a neighbor table, wherein the neighbor table is based on messages received from different network nodes. The network node further selects an association between network nodes in the BLE mesh network taking the neighbor table into account.

According to another aspect the object is achieved by providing a network node for handling communication of data in a BLE mesh network. The network node is configured to obtain a neighbor table, wherein neighbor table is based on messages received from different network nodes; and to select an association between network nodes in the BLE mesh network taking the neighbor table into account.

It is furthermore provided herein a computer program product comprising instructions, which, when executed on at least one processor, cause the at least one processor to carry out any of the methods above, as performed by the network node. It is additionally provided herein a computer-readable storage medium, having stored thereon a computer program product comprising instructions which, when executed on at least one processor, cause the at least one processor to carry out the method according to any of the methods above, as performed by the network node.

According to still another aspect the object is achieved by providing a network node comprising processing circuitry. The processing circuitry is configured to obtain a neighbor table in a BLE mesh network, wherein neighbor table is based on messages received from different network nodes; and to select an association between network nodes in the BLE mesh network taking the neighbor table into account.

Embodiments herein relate to an apparatus and a method to use a neighbor table to increase the communication reliability of the selecting associations between network nodes, such as creating route and friendship between the network nodes, in a BLE mesh network. The neighbor table may keep track of the signal strength or quality of all radio links or channels to network nodes within a mesh router radio vicinity e.g. defined by number of hops e.g. one hop. The network node may perform signal strength or quality measurements, such as long term RSSI measurements, optionally, the network node may use filter methods to post-process the measurement result. In the neighbor table, the network nodes that are qualified with a reliable radio link in terms of signal strength or quality measurements may be marked as route selection candidates. Only the route selection candidates may be selected during the creation of route procedure. In some embodiments the neighbor table may also be used for friendship establishment procedure between e.g. an LPN and the network node.

Embodiments herein increase the reliability of hop-by-hop message communication since embodiments herein may be used to increase the reliability of e.g. the created routes in a BLE mesh network. It is also possible to use embodiments to increase the reliability of the communication between the network node such as an LPN and its friend node. Some embodiments herein solve problems that are special for the BLE mesh network, e.g., frequency agility, fixed advertisement channels during scanning and RSSI fluctuation over channel and time.

Embodiments herein improve performance of the wireless communications network in an efficient manner by selecting one or more associations between network nodes in the BLE mesh network with a high reliability due to the neighbor table used.

BRIEF DESCRIPTION OF THE DRAWINGS

Embodiments will now be described in more detail in relation to the enclosed drawings, in which:

FIGS. 12-15 are flowcharts illustrating methods implemented in a communication system including a host computer, a base station and a user equipment.

DETAILED DESCRIPTION

Figure 1:
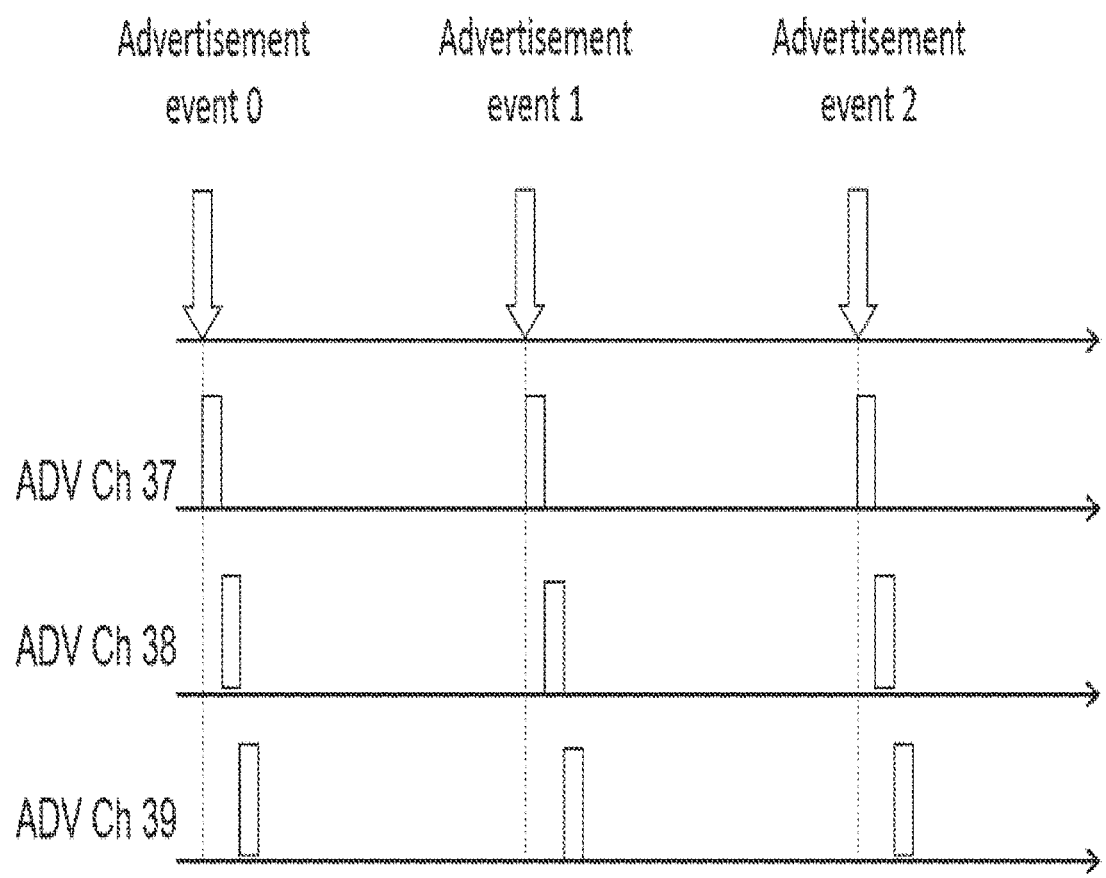
FIG. 1 is a schematic overview depicting mesh message triplet transmissions on three advertisement channels.
Figure 2A:
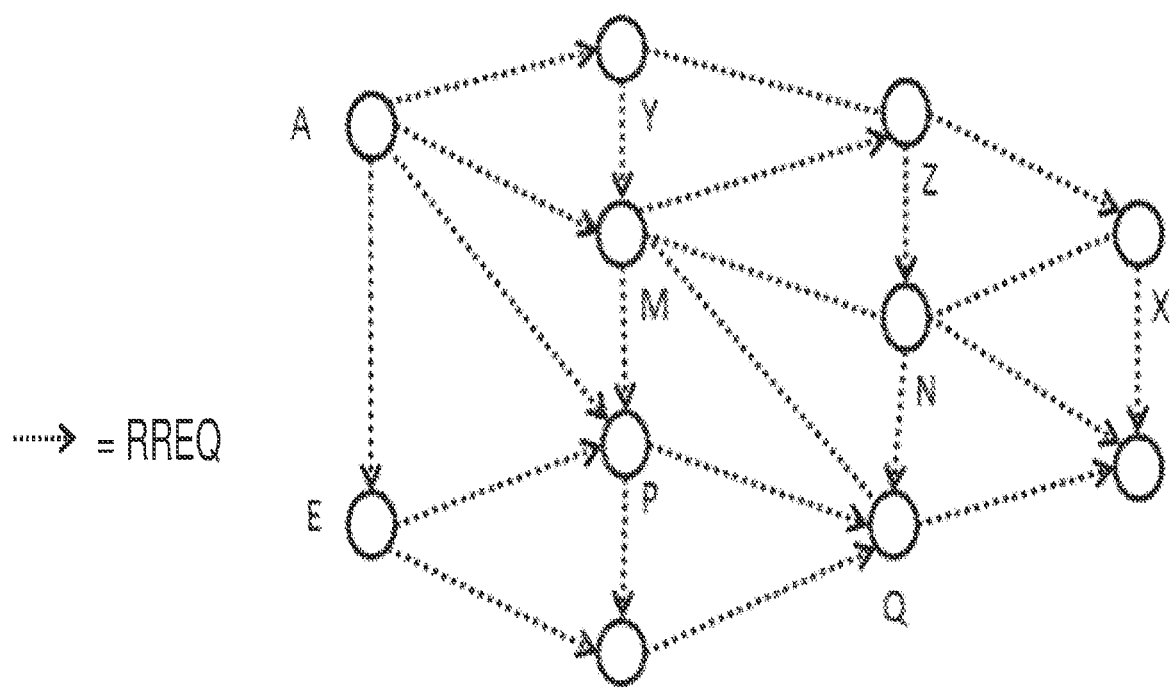
FIG. 2A is a schematic overview depicting a route request propagation.
Figure 2B:
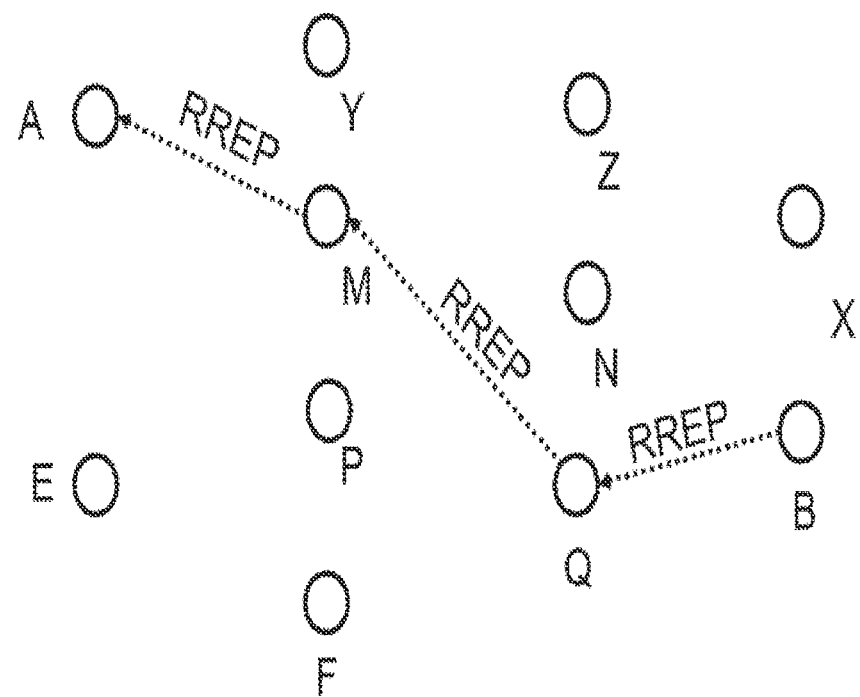
FIG. 2B is a schematic overview depicting a route creation procedure using RREP.
Figure 3:
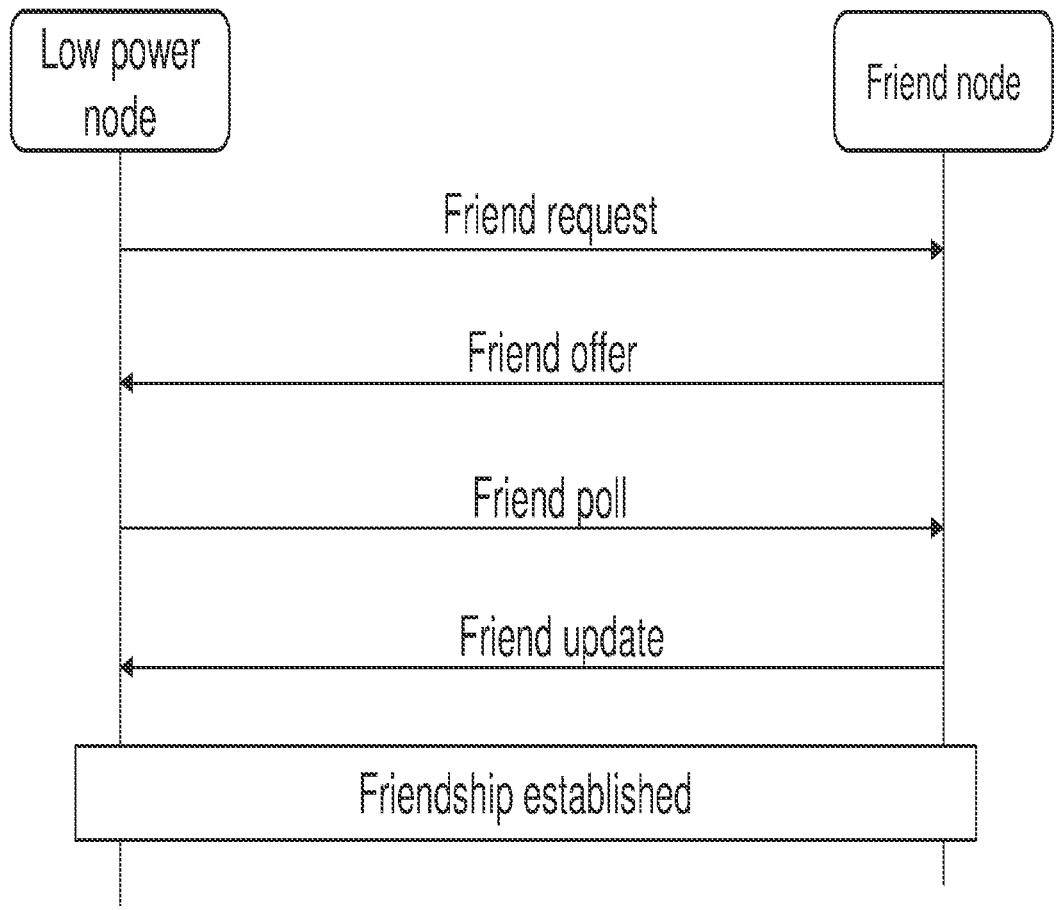
FIG. 3 shows a friendship establishment procedure.
Figure 4:
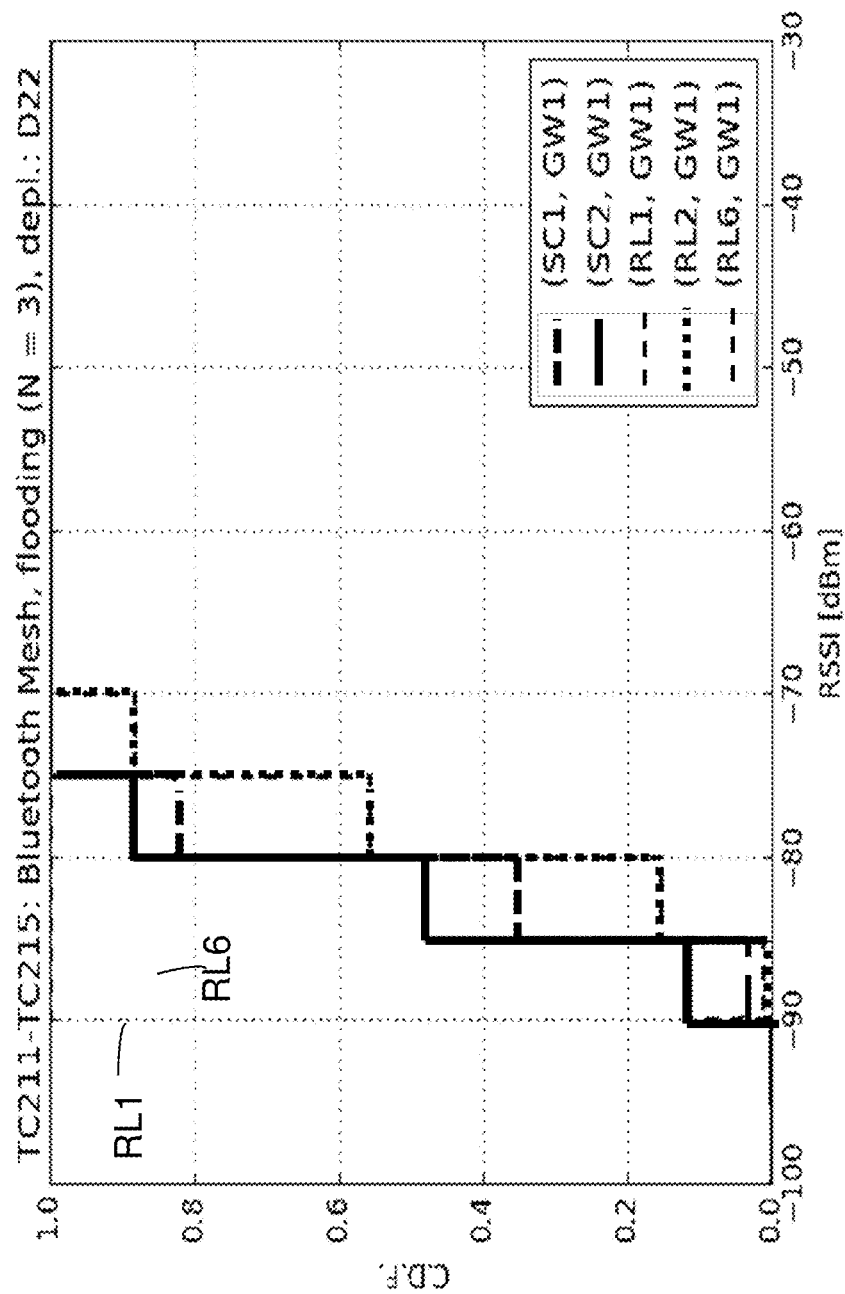
FIG. 4 shows RSSI measurement summary.
Figure 5:
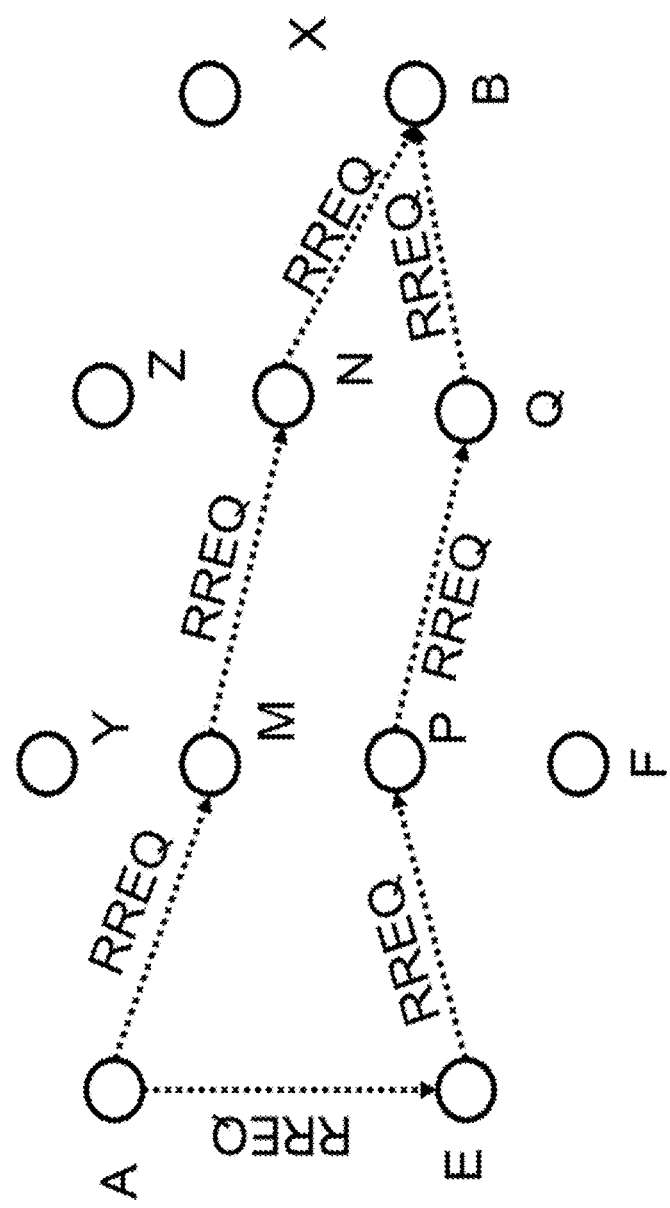
FIG. 5 shows a hop count based route selection algorithm.
Figure 6A:
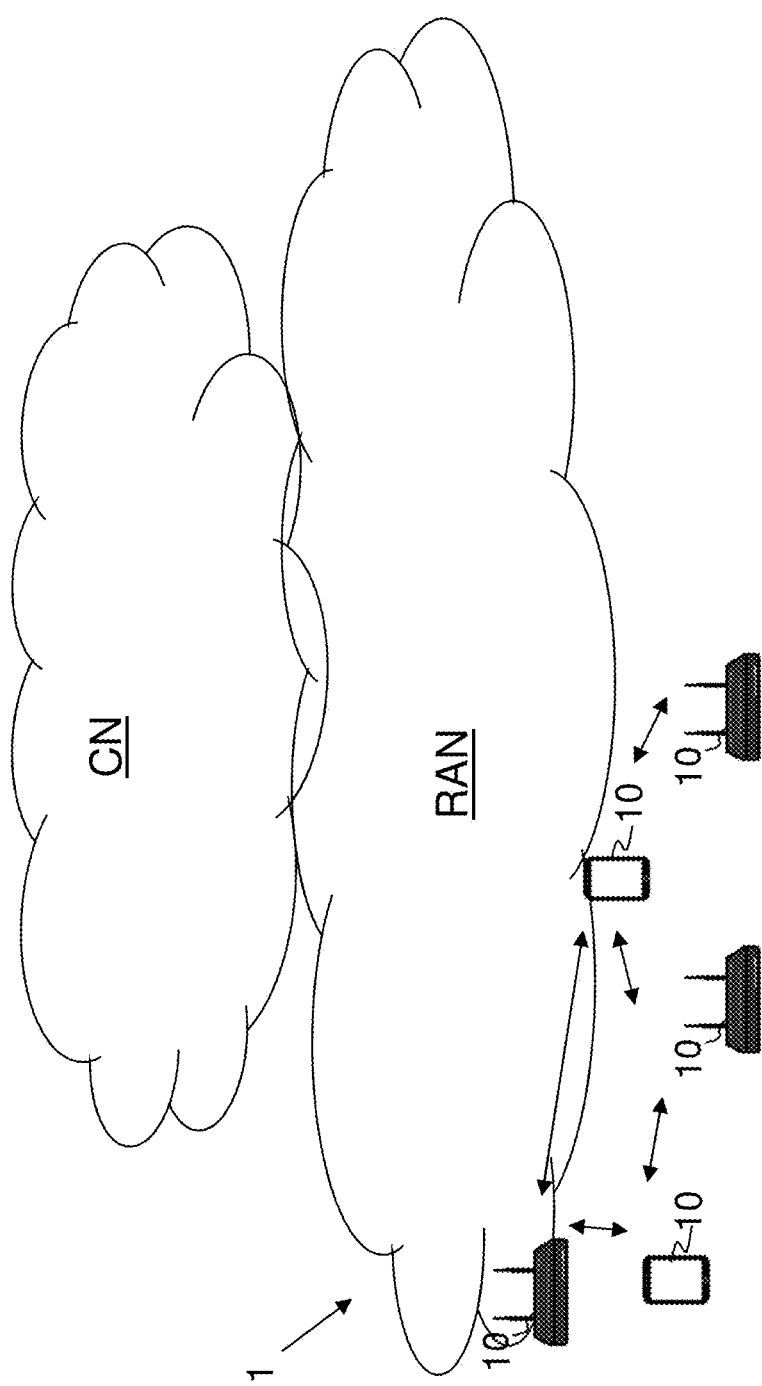
FIG. 6A is a schematic overview depicting a wireless communications network according to embodiments herein.

Embodiments herein relate to wireless communications networks in general. FIG. 6A is a schematic overview depicting a wireless communications network 1. The wireless communications network 1 is a BLE mesh network.

In the BLE mesh network, network nodes 10 also referred to as relay nodes, routers, route nodes, LPN, route destination node, route origination node and may be exemplified as a mobile station, a non-access point (non-AP) station (STA), a STA, a user equipment and/or a wireless device, are spread out in the wireless communications network 1 and may communicate with one another or via the one or more RANs, to the one or more CNs. It should be understood by those skilled in the art that "wireless device" is a non-limiting term which means any terminal, wireless communication terminal, communication equipment, Machine Type Communication (MTC) device, Device to Device (D2D) terminal, or user equipment e.g. smart phone, laptop, mobile phone, sensor, relay, mobile tablets or any device communicating within a service area over a short range with other devices.

According to embodiments herein a creation of a neighbor table is shown and also a maintenance of the neighbor table for maintaining the neighbor table is disclosed as well as usage of the neighbor table. Embodiments herein provide a method to increase the communication reliability of e.g. the route created by the routing operations defined in the current mesh routing specification.

Figure 6B:
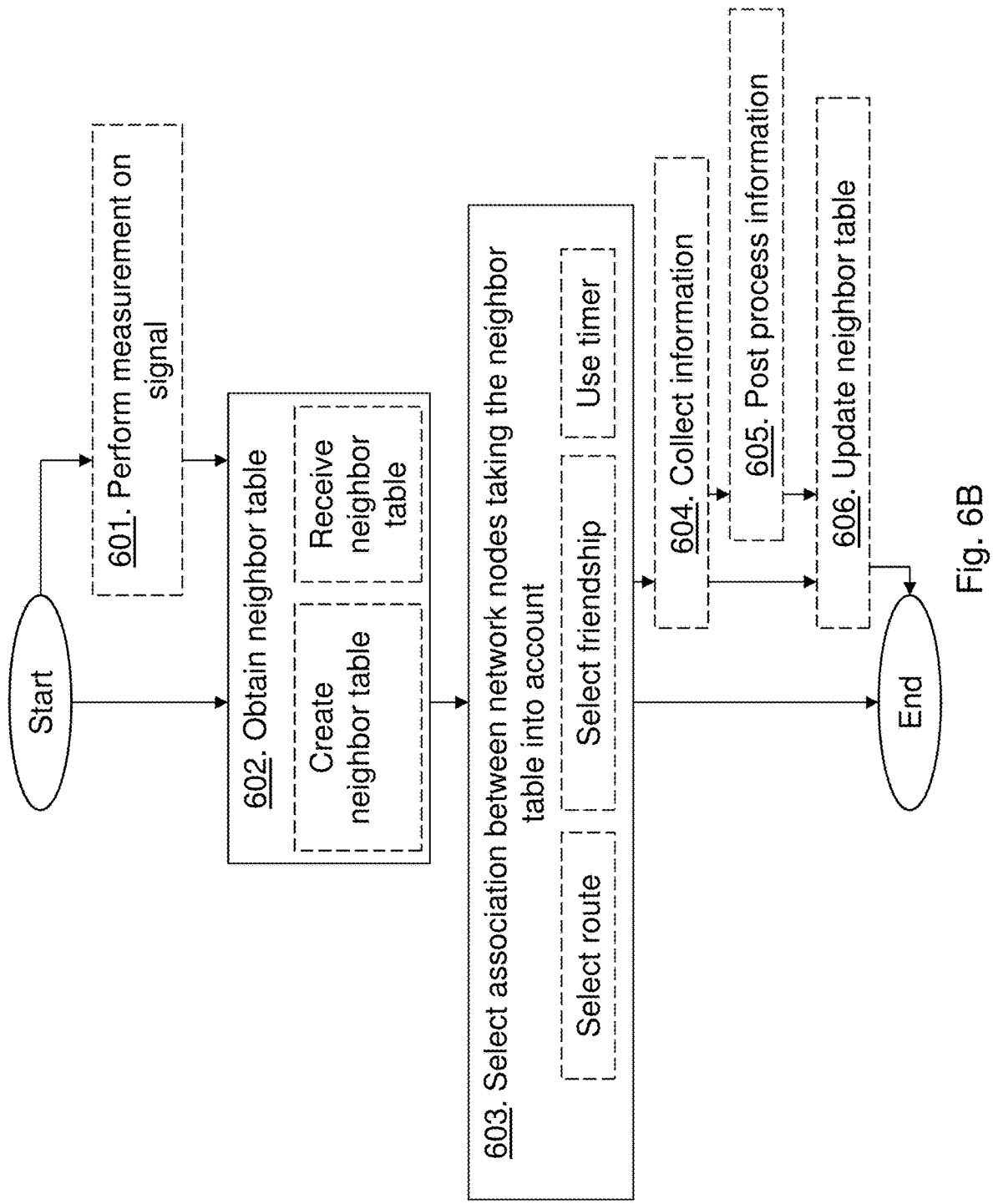
FIG. 6B shows a flowchart depicting a method performed by a network node according to embodiments herein.

The method actions performed by the network node for handling communication of data in the BLE mesh network according to embodiments will now be described with reference to a flowchart depicted in FIG. 6B. The actions do not have to be taken in the order stated below, but may be taken in any suitable order. Actions performed in some embodiments are marked with dashed boxes.

Action 601. The network node 10 may perform signal strength or quality measurements such as long term RSSI measurements, optionally, the network node may use filter methods to post-process the measurement result. Embodiments herein may use three different channels, advertisement channels, for sending message on, such as RREQ and RREP messages, and there is no channel correlation between network nodes so that the message transmitter cannot predict from which channel the message will be received by the peer nodes. In this case, the information of all three channels may need to be considered for neighbor qualification.

Action 602. The network node 10 obtains a neighbor table, wherein the neighbor table is based on messages received from different network nodes, e.g. received over the three different channels. The messages may be BLE mesh messages. The messages may comprise information, wherein the information comprises one or more of the following: received message signal strength; an identity that identifies a device in a BLE mesh network; and an advertisement channel index, and wherein the network node obtains the neighbor table by creating the neighbor table based on the information of the received messages. The network node 10 may be preconfigured with the neighbor table or receive the neighbor table from another network node. The neighbor table may be preconfigured when the wireless communications network is stationary and the signal strength or quality of the network node with the other network nodes included in the neighbor table is measured and tested. The network node 10 may create the neighbor table based on e.g. one or more messages received from different network nodes. The message may be e.g. a RREQ, a RREP, a routing information (RINFO) message, a network information message, a friend request, or a friend offer. This is exemplified in FIG. 7.

For creating the neighbor table the network node 10 may send a route request message through the wireless communications network 1. This may be initiated by receiving a route request from a different network node. The route request message may be a single-hop broadcast message. The network node 10 may then receive one or more route response messages from one or more network nodes. From these one or more route response messages the network node 10 determine signal strength or quality to the respective other network node. The network node 10 may also transmit a route response message to the different network node transmitting the route request message. The network node 10 may then add the one or more network nodes into the neighbor table based on the determined signal strength or quality. The network node 10 may add the network node into the neighbor table further based on channel identity indicated in the route response message. The one or more network nodes added into the neighbor table may be indicated in the neighbor table with identity of the network node, signal strength and/or channel identity. The network node 10 may in some embodiments transmit a friend request and keep collecting one or more friend offers in different advertisement channels to take into account when creating the neighbor table.

Action 603. The network node 10 selects association between network nodes in the BLE mesh network taking the neighbor table into account. E.g. the network node 10 may select the association by selecting a route between the network node 10 and a different network node based on the neighbor table. For example, in case the network node 10 receives a route request message from a transmitting network node which is not at the neighbor table of the network node 10, the network node 10 may discard the received route request message. Alternatively or additionally, the network node 10 may select association by setting up a friendship to another network node based on the neighbor table. For example, in case the network node 10 receives a friendship request message from the transmitting network node which is in the neighbor table of the network node 10, the network node 10 may set up the friendship to the transmitting network node. Hence, the network nodes that are qualified with a reliable radio link in terms of signal strength or quality measurements may be marked as route selection candidates in the neighbor table. Only the route selection candidates may be selected during the route creation procedure and/or the friendship establishment procedure. The purpose of the friendship is that e.g. the low power node delegates the message receiving function to a selected mains-powered network node so that the mains-powered network node may buffer the message destined to the low power node. In order to receive most of the messages, the receiver of the friend node may be always on, keeping the LPN always on will result in a power consumption that is too high for the low power node that is powered by e.g. a coin cell battery. The network node may further, when selecting association, use a timer to periodically compare a current time with a last reported timestamp.

Action 604. The network node 10 may collect the information related to the messages.

Action 605. The network node 10 may post-process the information by filtering the information.

Action 606. The network node 10 may further update the neighbor table based on the collected information (see FIG. 7).

Figure 7:
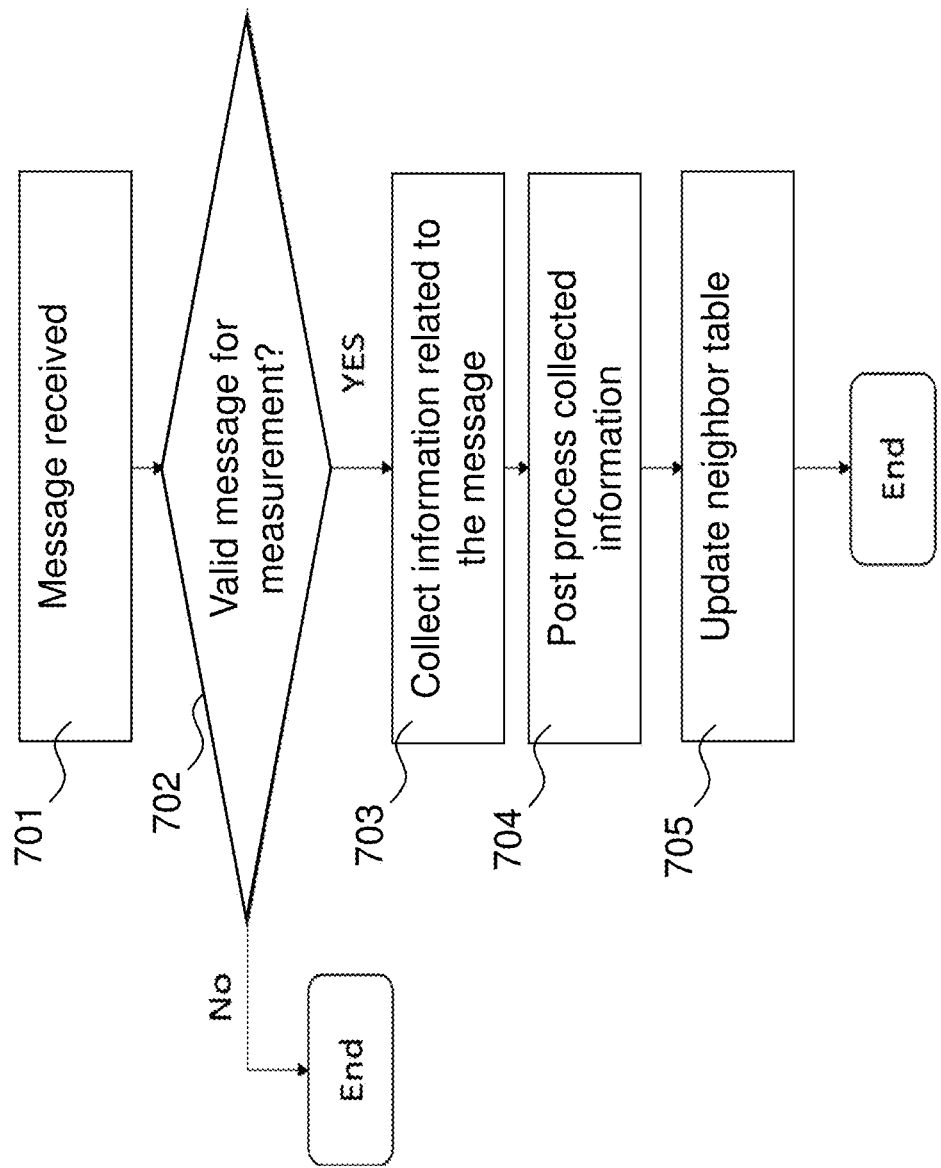
FIG. 7 depicts some aspects of embodiments herein e.g. for updating the neighbor table.

The general procedure of creating and maintaining neighbor table entries are described in FIG. 7. Once a BLE mesh message is received, action 701, the message is analyzed to determine if it can be used for neighbor table measurement, action 702. If so, the information such as source network address, channel number and RSSI values may be collected from the received message, action 703. The collected information is optionally further processed in a post-processing operation, action 704. The process result is then used for neighbor table update, action 705. The following sections describes these actions in detail.

A BLE mesh message may contain the network address of the source network node (message generator) and the route destination node. Once a message is forwarded by a relay node, the network address of the relay node 10 is not included in the RREQ message. Due to this reason, a network node cannot use every message it receives for neighbor device measurement. Additionally, each BLE mesh message may comprise a Time To Live (TTL) value to control the maximum number of times that a message may be relayed. Once a message is relayed, the value of TTL is decreased by one. A message with TTL=1 cannot be relayed any further. It is also possible for a source network node to send a message with TTL equal to 0. This implies that such messages are not supposed to be relayed at all. In general, a BLE mesh message that can be used for neighbor table measurement may fulfill one or more of the following criteria:

1. A message that is initially sent with a TTL value equal to 0. Specifically, the following messages are defined in the current mesh specification to use TTL=0.
   a. Routing information (RINFO) message or NINFO message: A message that informs other network nodes its presence and routing entries.
   b. Route request: A broadcast message that is used during a route discovery procedure.
   c. Route reply: A unicast message that assigns a router to a route.
   d. Friend request: A unicast message from e.g. a low power node to a mains-powered node to initiate friendship establishment. Mains-powered meaning being powered from a mains power system e.g. electrical grid.
   e. Friend offer: A unicast message from a mains-powered node to offer friendship to e.g. a low power node.
2. Any message that contains its original TTL value, e.g. the TTL value set by the message originator, in the application payload statically, which is same as the received TTL value contained in the message network layer. One example of such message is the first hop of the heart beat message.
3. By using some proprietary methods, the message that can be identified as a single hop message and the address of sender can be retrieved.

Requirements of a sender of the message, which sender sends messages which may be used for neighbor table measurement. To have a long term and frequently measured radio link between each device, the sender may periodically send at least one kind of messages described above. The network node 10 may enable the routing info (RINFO) feature. As defined by the BLE mesh routing specification, the RINFO message is sent every 30 seconds. The sent RINFO message may contain the Transmission (Tx) power and, if not defined by the specification, a repetition period of the message or any kind of information that indicates a next expected message. This will help the receiving network node to identify if it has missed a message when nothing is received.

In a BLE mesh network, there might be a type of network node which is mains-powered and its receiver is always on. But this type of network node might not send or rarely send any messages, this type of network node can be denoted as a mains-powered silent node. In order to support the neighbor table functions, these network nodes are required to periodically send at least one kind of message defined above. The LPN stays at "deep sleep mode" most of the time. The mains-powered friend relay node helps the network node 10 to create and maintain its routes. However, if the network node 10 wants to use a neighbor table for friendship measurement, the network node 10 may periodically send the friend request and keep collecting the friend offer in different advertisement channels.

As described above, the network node 10 cannot control which advertisement channel to scan on. In this case, once a message for neighbor table measurement is received at the network node 10, the network node 10 may be able to extract the following information for further processing:

RSSI value, the received message signal strength;
Device identifier, an identity that can uniquely identify a transmitting network node in the BLE mesh network, e.g., network address of the transmitting network node;
Advertisement channel index. There are three advertisement channels defined in BLE technology, it is important to know from which channel the messages are received. However, the advertisement channel index is not defined in the standard BLE interface. Some proprietary method may be needed to get the channel index. Alternatively, it is also possible to keep the measurement result with relative advertisement index.

As descried above, the scanner always scans a new advertisement channel after each SCAN_INTERVAL, it is possible to maintain an internal counter to keep track of the current advertisement index which matches the received BLE mesh messages.

Finally, to have a fair measurement over all three advertisement channels, the message receiver may adapt its scan interval so that the network node 10 may receive similar amount of messages from all three channels. For example, if the RINFO message is enabled and sent by the message sender every 30th second, the advertising interval can be configured to be 7.5 sec per advertisement channel.

Each network node such as a router node may be a message receiver and a message sender. The mains-powered silent node may be at least a message sender. The network node 10 may use friendship procedure and may delegate the route discovery procedure to its friend node. However, if the network node 10 wants to use a neighbor table for friendship measurement, it may periodically send the friend request and keep collecting the friend offer from different advertisement channels. In this case, the network node 10 may be a message sender and a message receiver.

The purpose of the post processing procedure, see action 704, is to provide a method to reflect the "reality" or an accuracy of the radio link quality by minimizing the randomness of the input data. It is possible to use different filter operations to post-process the received message information. However, different from ordinary filtering operation, the one used for neighbor table maintenance should properly match e.g. the advertising channel with the measured RSSI values. Additionally, the filter operation may provide a method to indicate whether a received RSSI value is lower than a predefined RSSI threshold, called a low RSSI threshold, for example, −85 dBm.

For example, a possible filtering operation for the post-processing procedure is averaging the latest five measured RSSI values. The averaged values may be calculated per advertisement channel or all three advertisement channels. When the received RSSI value is lower than the low RSSI threshold, in addition to the average value, the operation also indicates that the latest measured RSSI value is lower than the threshold.

Table 1 shows a table structure of one possible implementation of the average filter. The RSSI values of device 0xABCD are stored per advertisement channel. For each channel, the latest 5 RSSI values are stored. Once a new message is received, the oldest RSSI value is replaced by the latest value per advertisement channel. The equivalent RSSI value is calculated using the average of the collected RSSI value per channel. In this case, for device 0xABCD, the RSSI value of channel 37 is −75 dBm. The RSSI value of channel 38 is −73. The RSSI value of channel 39 is −70 dBm. Additionally, since the last received RSSI from channel 39 is −88, which is below the defined RSSI threshold, the Low RSSI Indicator bit is set.

TABLE 1

Example of the table used for average filter operation

| Device Address | Channel Index | RSSI 0 | RSSI 1 | RSSI 2 | RSSI 3 | RSSI 4 | Avg. Result | Low RSSI Indicator |
|---|---|---|---|---|---|---|---|---|
| 0xABCD | ADV Ch.37 | −77 | −75 | −69 | −80 | −75 | −75 | 0 |
|  | ADV Ch.38 | −79 | −65 | −80 | −66 | −75 | −73 | 0 |
|  | ADV Ch.39 | −69 | −75 | −60 | −61 | −88 | −70 | 1 |

Once a new message is received and post processed by the filter operation, the calculated result together with the Low RSSI Indicator is sent as the input to update the neighbor table.

There are mainly three functions that shall be supported by the neighbor table, storing the current network node radio link information per device per channel, aging the neighbor table entry and update the neighbor table device status.

Table 2 shows one example of the neighbor table. An address field uniquely identifies a network node in the BLE mesh network, e.g., the network address of the network node 10. The RSSI value is stored per advertisement channel for each device. The RSSI value can either be the information retrieved directly from the message or it can be the calculated value from the post process filter operation. The periodicity is an optional field. When used together with the last report timestamp, the node can calculate the time of the next expected coming message. By doing this, a BLE mesh node can identify if a message has completely missed due to the poor radio link. The neighbor flag indicates if a network node is considered as a neighbor with reliable radio link.

TABLE 2

Example of neighbor table format

| Address | Channel Index | RSSI | Periodicity | Neighbor Flag | Last reported timestamp |
|---|---|---|---|---|---|
| 0xABCC | ADV Ch.37 | −65 | 30 | True | 12341234 |
|  | ADV Ch.38 | −55 | 30 |  | 12341249 |
|  | ADV Ch.39 | −60 | 30 |  | 12341233 |
| 0xABCD | ADV Ch.37 | −75 | 30 | False | 12341220 |
|  | ADV Ch.38 | −73 | 30 |  | 12341231 |
|  | ADV Ch.39 | −88 | 30 |  | 12341239 |

The periodicity field shown in Table 2 only works when there is only one kind of periodic message received from the network node. If the network node sends multiple types of messages periodically, a field may be extended per message type. Table 3 shows one example of an extended periodicity field.

TABLE 3

Extended periodicity filed which stores the periods of different message type.

| Device Address | Channel Index | RSSI | Periodicity | |
|---|---|---|---|---|
| 0xABCC | ADV Ch.37 | −65 | Message type | interval |
| | | | RInfo | 30 |
| | | | Time Beacon | 25 |

The neighbor table aging method keeps track of the time of the measurement result of each network node. It disqualifies a network node from a neighbor network node by setting the "neighbor flag" false. One possible implementation of the aging method is using a timer to periodically compare the current time with the "last reported timestamp". If the timespan between the current time and the last report timestamp is bigger than the value of the periodicity, a missing message is detected. If missing messages are frequently detected in one or more advertisement channels, this indicates that the communication is not stable via this network node. In this case, the network node should be disqualified from the neighbor table.

In parallel, the neighbor table use rules to decide whether a network node may be set as a neighbor network node using the received RSSI value. Different rules can be used for updating the neighbor table entry status. One examples of such operation is a hysteresis comparison. For example, if the RSSI value of the received message is lower than −70 dBm, the network node may be disqualified. Otherwise, if the RSSI value is higher than −67 dBm, the network node may be promoted as neighbor network node. Another possible rule is to define a window to detect that the frequency of a message of low RSSI is above a count threshold. For example, if the received RSSI value is lower than the threshold more than 3 times in the last 10 measurements, the neighbor is disqualified.

A neighbor network node may only be qualified if it is qualified by both the aging method and the neighbor table management rules.

The neighbor table measurement is a long term measurement. It takes time to collect all necessary information before the neighbor network node decision making. In order to have a faster decision, one possible rule might be, if a neighbor table does not have enough information to make decision, and if the received message RSSI value is 30 dB higher than its receive sensitivity, a network node can be considered as a neighbor network node.

Figure 8:
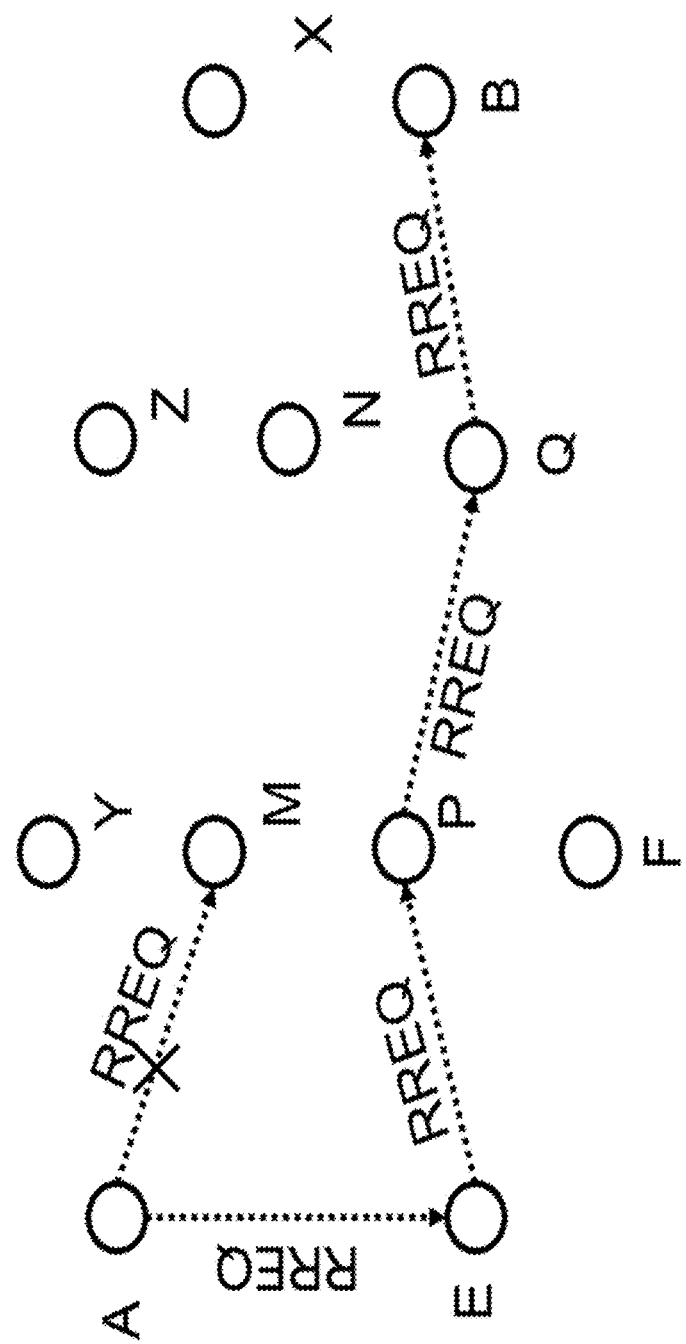
FIG. 8 is a RREQ filter based on a neighbor table according to embodiments herein.

In order to create a reliable route, the neighbor table may be used. Only network nodes marked as neighbor network nodes may be considered as route selection candidates. One example of using the neighbor table is to filtering the received RREQ messages. The received RREQ message is discarded if the network source address of the message is not qualified in the router neighbor table. In this case, such RREQ message will not be forwarded by the network node 10. FIG. 8 shows an example of using neighbor table for RREQ message filtering. During the route creation procedure, router M receives the RREQ from A. However, since A is not marked as neighbor network node due to the poor radio link, the received RREQ is discarded. In this case, the RREQ will not be forwarded by M and the route from A->E->P->Q->B is selected instead.

During the friendship establishment procedure, an LPN implementing the neighbor table may send multiple friend requests and collects multiple friend offers and populate the neighbor table with friends from which friend offers are received. In order to maximize measurements on different channels, the scanning periods and the period between the transmission of friend request messages may be synchronized so that friends offers are received on different channels.

It is herein disclosed:
Description of message types that can be used for neighbor table measurement.
Requirements for a mesh node to support neighbor table measurement.
Example to create and maintain the neighbor table entries.
The description of methods to use the neighbor table during route creation and friendship creation procedure are presented herein.

The proposed neighbor table methods are independent from the route selection algorithms, by using the network nodes from the neighbor table, the communication reliability of each hop is increased. This idea is tailored by considering the specialty of BLE mesh communications, i.e., frequency agility, fixed advertisement channels during scanning and RSSI fluctuation over channel and time.

Figure 9:
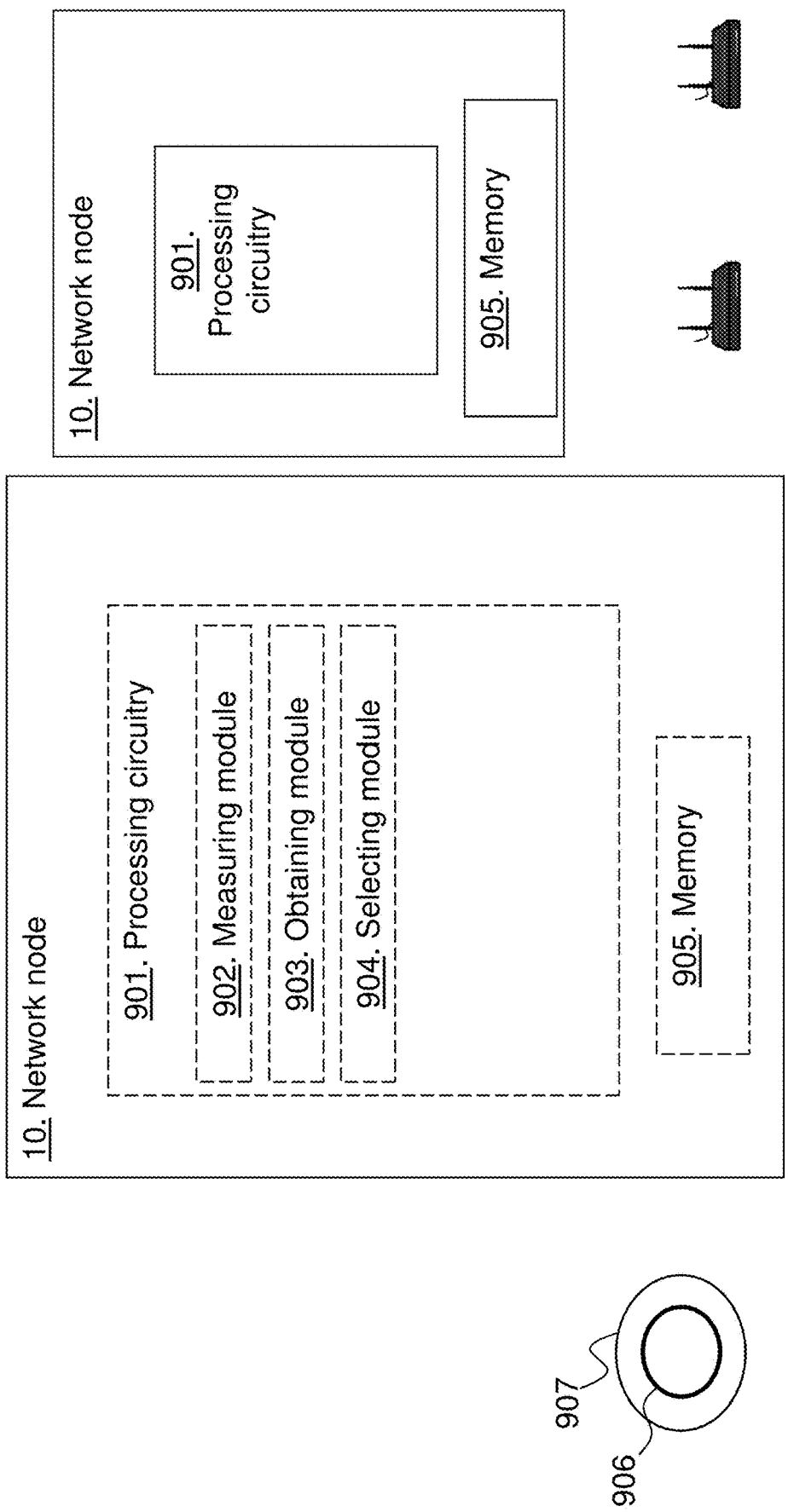
FIG. 9 is a block diagram depicting a network node according to embodiments herein.

FIG. 9 is a block diagram depicting the network node 10, in two embodiments, for handling communication of data in a BLE mesh network.

The network node 10 such as a router or relay node may comprise processing circuitry 901, e.g. one or more processors, configured to perform the methods herein.

The network node 10 may comprise a measuring module 902. The network node 10, the processing circuitry 901 and/or the measuring module 902 may be configured to perform one or more signal strength or quality measurements. The network node 10, the processing circuitry 901 and/or the measuring module 902 may be configured to use filter methods to post-process the measurement results.

The network node 10 may comprise an obtaining module 903. The network node 10, the processing circuitry 901 and/or the obtaining module 903 is configured to obtain the neighbor table, e.g. create the neighbor table, based on messages received from different network nodes. The messages may be BLE mesh messages. The messages may comprise information, wherein the information is one or more of the following:
received message signal strength;
an identity that identifies a device in the BLE mesh network; and
advertisement channel index, and wherein the network node is configured to obtain the neighbor table by creating the neighbor table based on the information of the received messages. The network node 10, the processing circuitry 901 and/or the obtaining module 903 may be configured to collect the information related to the messages; and to update the neighbor table based on the collected information. The network node 10, the processing circuitry 901 and/or the measuring module 902 may be configured to post-process the information by filtering the information.

The network node 10 may comprise a selecting module 904. The network node 10, the processing circuitry 901 and/or the selecting module 904 is configured to select the association between network nodes in the BLE mesh network taking the neighbor table into account e.g. one or more associations between network nodes taking the neighbor table into account. E.g. the network node 10, the processing circuitry 901 and/or the selecting module 904 may be configured to select association by selecting the route between the network node and the different network node based on the neighbor table. Alternatively or additionally, the network node 10, the processing circuitry 901 and/or the selecting module 904 may be configured to select one or more association by setting up a friendship to another network node based on the neighbor table. Alternatively or additionally, the network node 10, the processing circuitry 901 and/or the selecting module 904 may be configured to select association by using a timer to periodically compare a current time with a last reported timestamp.

The network node 10 further comprises a memory 905. The memory comprises one or more units to be used to store data on, such as network IDs, resources, measurements, neighbor table, post process information, applications to perform the methods disclosed herein when being executed, and similar. Thus, the network node 10 may comprise the processing circuitry and the memory, said memory comprising instructions executable by said processing circuitry whereby said network node is operative to perform the methods herein.

The methods according to the embodiments described herein for the network node 10 are respectively implemented by means of e.g. a computer program product 906 or a computer program, comprising instructions, i.e., software code portions, which, when executed on at least one processor, cause the at least one processor to carry out the actions described herein, as performed by the network node 10. The computer program product 906 may be stored on a computer-readable storage medium 907, e.g. a disc, a universal serial bus (USB) stick or similar. The computer-readable storage medium 907, having stored thereon the computer program product, may comprise the instructions which, when executed on at least one processor, cause the at least one processor to carry out the actions described herein, as performed by the network node 10. In some embodiments, the computer-readable storage medium may be a transitory or a non-transitory computer-readable storage medium.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of radio network nodes will appreciate the cost, performance, and maintenance trade-offs inherent in these design choices.

It is herein disclosed a method performed by a network node for handling communication of data in a wireless communications network. The network node obtains a neighbor table e.g. creates the neighbor table based on e.g. messages received from different network nodes. The network node selects association between network nodes taking the neighbor table into account. E.g. the network node may select association by selecting a route between the network node and a different network node based on the neighbor table. Alternatively or additionally, the network node may select association by setting up a friendship to another network node based on the neighbor table.

It is further herein disclosed a network node for handling communication of data in a wireless communication network. The network node may be configured to perform one or more signal strength or quality measurements. The network node may further be configured to obtain a neighbor table e.g. create the neighbor table based on e.g. messages received from different network nodes. The network node is configured to select one or more associations between network nodes taking the neighbor table into account. E.g. the network node 10 may be configured to select one or more associations by selecting a route between the network node and a different network node based on the neighbor table. Alternatively or additionally, the network node may be configured to select one or more associations by setting up a friendship to another network node based on the neighbor table.

Figure 10:
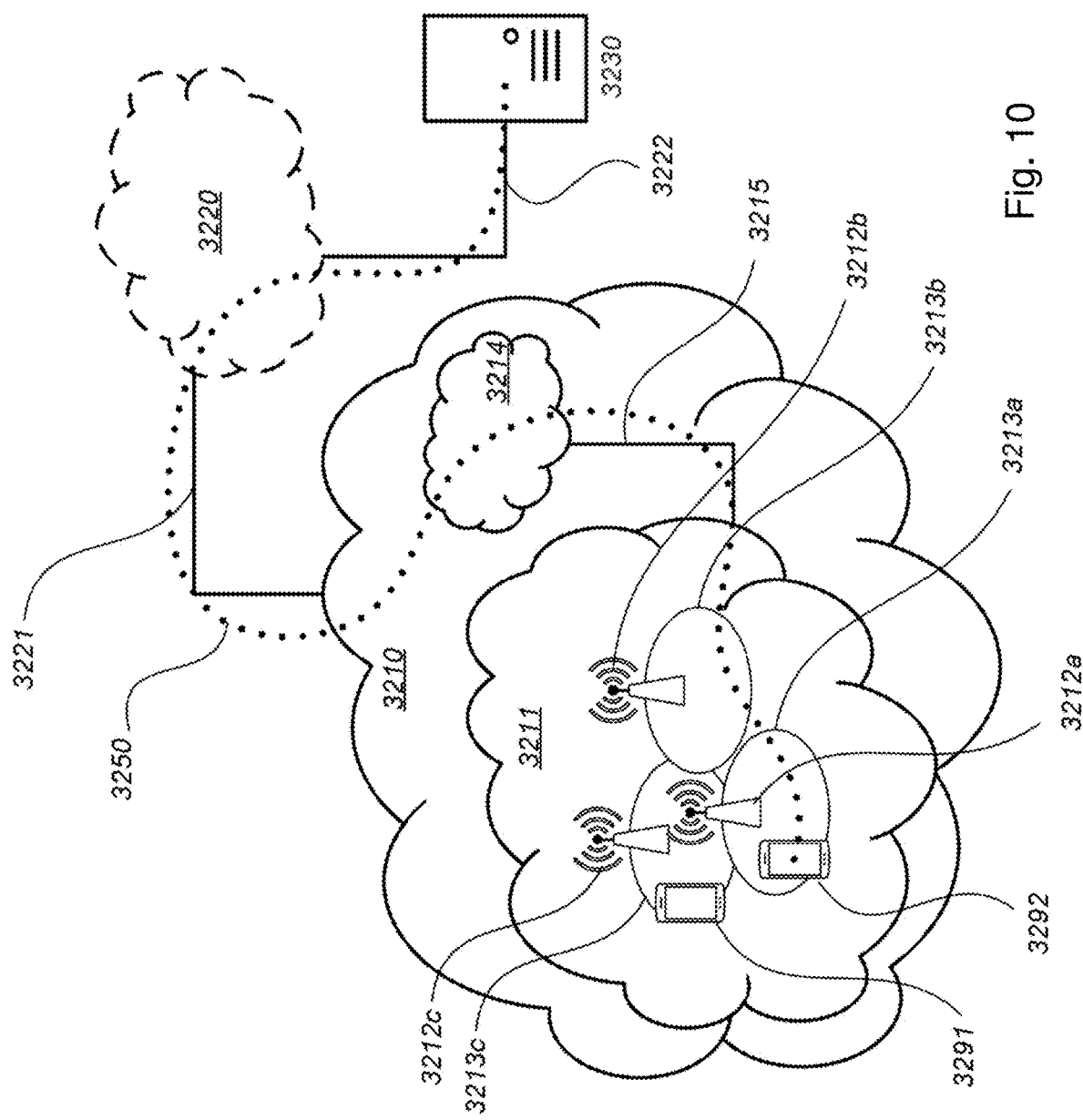
FIG. 10 schematically illustrates a telecommunication network connected via an intermediate network to a host computer.

With reference to FIG. 10, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points being examples of the network node herein, each defining a corresponding coverage area 3213a, 3213b, 3213c. Each base station 3212a, 3212b, 3212c is connectable to the core network 3214 over a wired or wireless connection 3215. A first user equipment (UE) 3291, being an example of the network node 10, located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 10 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 11. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 11) served by the base station 3320. The communication interface 3326 may be configured to facilitate a connection 3360 to the host computer 3310. The connection 3360 may be direct or it may pass through a core network (not shown in FIG. 11) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 11:
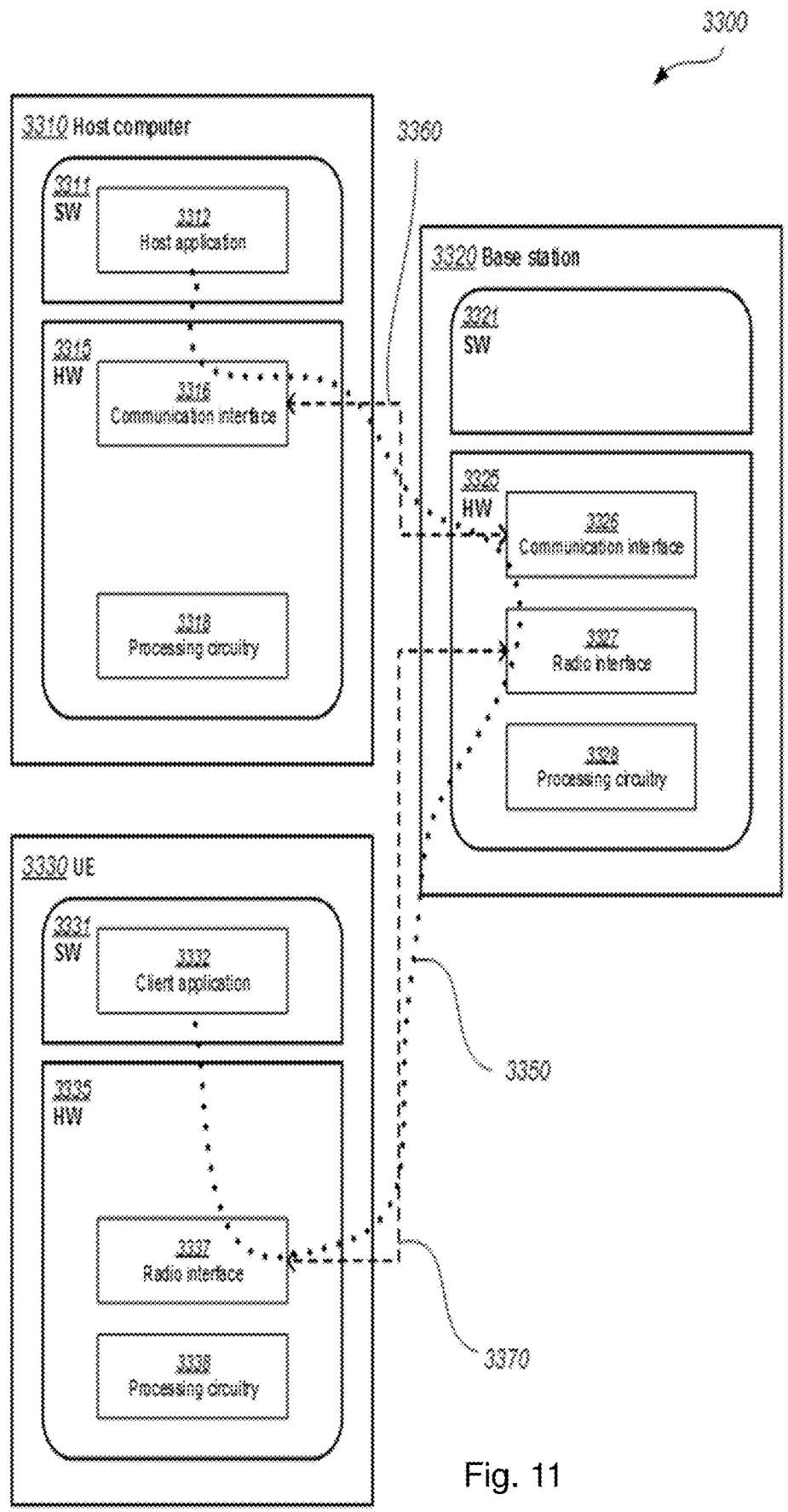
FIG. 11 is a generalized block diagram of a host computer communicating via a base station with a user equipment over a partially wireless connection.

It is noted that the host computer 3310, base station 3320 and UE 3330 illustrated in FIG. 11 may be identical to the host computer 3230, one of the base stations 3212a, 3212b, 3212c and one of the UEs 3291, 3292 of FIG. 10, respectively. This is to say, the inner workings of these entities may be as shown in FIG. 11 and independently, the surrounding network topology may be that of FIG. 10.

In FIG. 11, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve selection of associations such as route creation and thereby provide benefits such as reduced user waiting time, and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a network node for route creation in communication of data in a Bluetooth Low Energy (BLE) mesh network, the method comprising:
  obtaining a neighbor table based on messages received from different network nodes,
    wherein the message comprises information that comprises received message signal strength,
    wherein each of the different network nodes that are qualified with a reliable link based on the received message signal strength are marked as route selection candidates in the neighbor table,
    wherein each of the different network nodes for those the received message signal strength is lower than a threshold value, for more than a specific number of times in a last pre-determined number of times of the received message signal strength, are disqualified as the route selection candidates in the neighbor table, and
    wherein the specific number of times is smaller than the last pre-determined number of times;
  receiving a route request message from a transmitting network node; and
  discarding the route request message if the transmitting network node is not marked as one of the route selection candidates in the neighbor table.

2. The method according to claim 1, wherein the messages are BLE mesh messages.

3. The method according to claim 1, wherein the information further comprises one or more of the following:
  an identity that identifies a device in the BLE mesh network; and advertisement channel index, and
wherein obtaining the neighbor table comprises creating the neighbor table based on the information of the received messages.

4. The method according to claim 3, further comprising: collecting the information related to the messages; and updating the neighbor table based on the collected information.

5. The method according to claim 4, further comprising post-processing the information by filtering the information.

6. The method according to claim 1, further comprising:
setting up an association with the transmitting network node if the transmitting network node is marked as one of the route selection candidates in the neighbor table, wherein setting up the association comprises selecting a route between the network node and at least one of the different network node or the transmitting network node based on the neighbor table.

7. The method according to claim 1, further comprising setting up an association with the transmitting network node, wherein setting up the association with the transmitting network node comprises:
using a timer to periodically compare a current time with a last reported timestamp of the message transmitted by the transmitting network node;
identifying that the message transmitted by the transmitting network node has completely missed due to a poor radio link; and
disqualifying the transmitting network node from the neighbor table.

8. The method according to claim 1, wherein each of the different network nodes for those the received message signal strength is higher than received sensitivity by the threshold amount are qualified as the route selection candidates in the neighbor table.

9. A network node for route creation in communication of data in a Bluetooth Low Energy (BLE) mesh network, wherein the network node comprising:
processing circuitry configured to:
obtain a neighbor table based on messages received from different network nodes,
wherein the message comprises information that comprises received message signal strength,
wherein each of the different network nodes that are qualified with a reliable link based on the received message signal strength are marked as route selection candidates in the neighbor table,
wherein each of the different network nodes for those the received message signal strength is lower than a threshold value, for more than a specific number of times in a last pre-determined number of times of the received message signal strength, are disqualified as the route selection candidates in the neighbor table, and
wherein the specific number of times is smaller than the last pre-determined number of times;
receive a route request message from a transmitting network node; and
discard the route request message if the transmitting network node is not marked as one of the route selection candidates in the neighbor table.

10. The network node according to claim 9, wherein the messages are BLE mesh messages.

11. The network node according to claim 9, wherein the information further comprises one or more of the following:
an identity that identifies a device in the BLE mesh network, and
advertisement channel index, and
wherein the network node is configured to obtain the neighbor table by creating the neighbor table based on the information of the received messages.

12. The network node according to claim 11, wherein the processing circuitry is further configured to:
collect the information related to the messages, and
update the neighbor table based on the collected information.

13. The network node according to claim 12, wherein the network node is configured to post-process the information by filtering the information.

14. The network node according to claim 9, further comprising:
set up an association with the transmitting network node if the transmitting network node is marked as one of the route selection candidates in the neighbor table, wherein the network node is configured to set-up the association by selecting a route between the network node and at least one of the different network nodes or the transmitting network node based on the neighbor table.

15. The network node according to claim 9, wherein the network node is configured to set-up an association with the transmitting network node by using a timer to periodically compare a current time with a last reported timestamp of the message transmitted by the transmitting network node; identify that the message transmitted by the transmitting network node has completely missed due to a poor radio link; and disqualify the transmitting network node from the neighbor table.

16. A non-transitory computer-readable storage medium, having stored thereon instructions, which, when executed on at least one processor, causes the at least one processor to carry out the steps comprising:
obtaining a neighbor table based on messages received from different network nodes,
wherein the message comprises information that comprises received message signal strength,
wherein each of the different network nodes network nodes that are qualified with a reliable link based on the received message signal strength are marked as route selection candidates in the neighbor table,
wherein each of the different network nodes for those the received message signal strength is lower than a threshold value, for more than a specific number of times in a last pre-determined number of times of the received message signal strength, are disqualified as the route selection candidates in the neighbor table, and
wherein the specific number of times is smaller than the last pre-determined number of times;
receiving a route request message from a transmitting network node; and
discarding the route request message if the transmitting network node is not marked as one of the route selection candidates in the neighbor table.

* * * * *